Aug. 5, 1930.  A. L. WEIS  1,772,375
AUTOMOBILE SIGNALING APPARATUS
Filed May 20, 1929    6 Sheets-Sheet 1
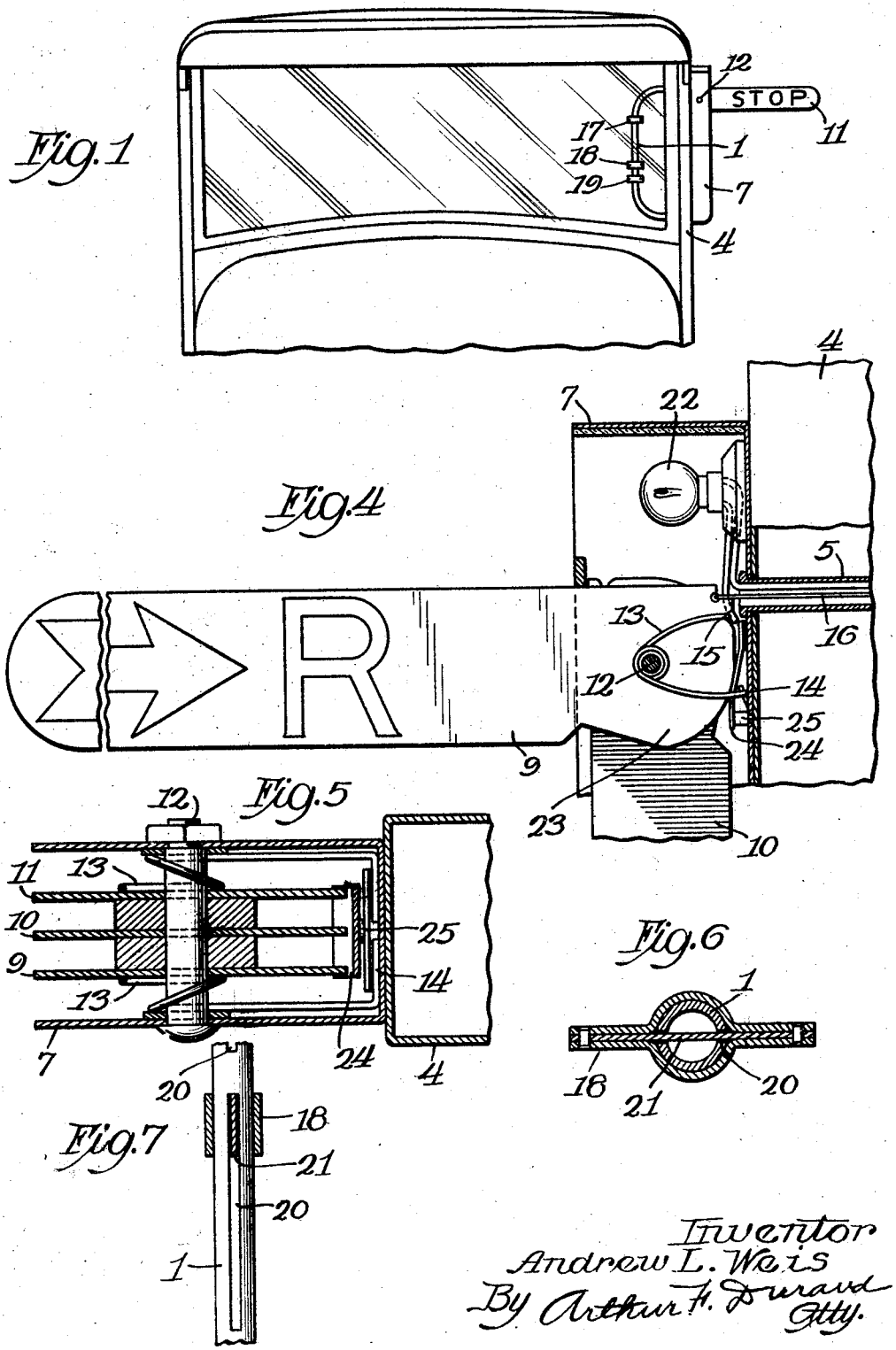

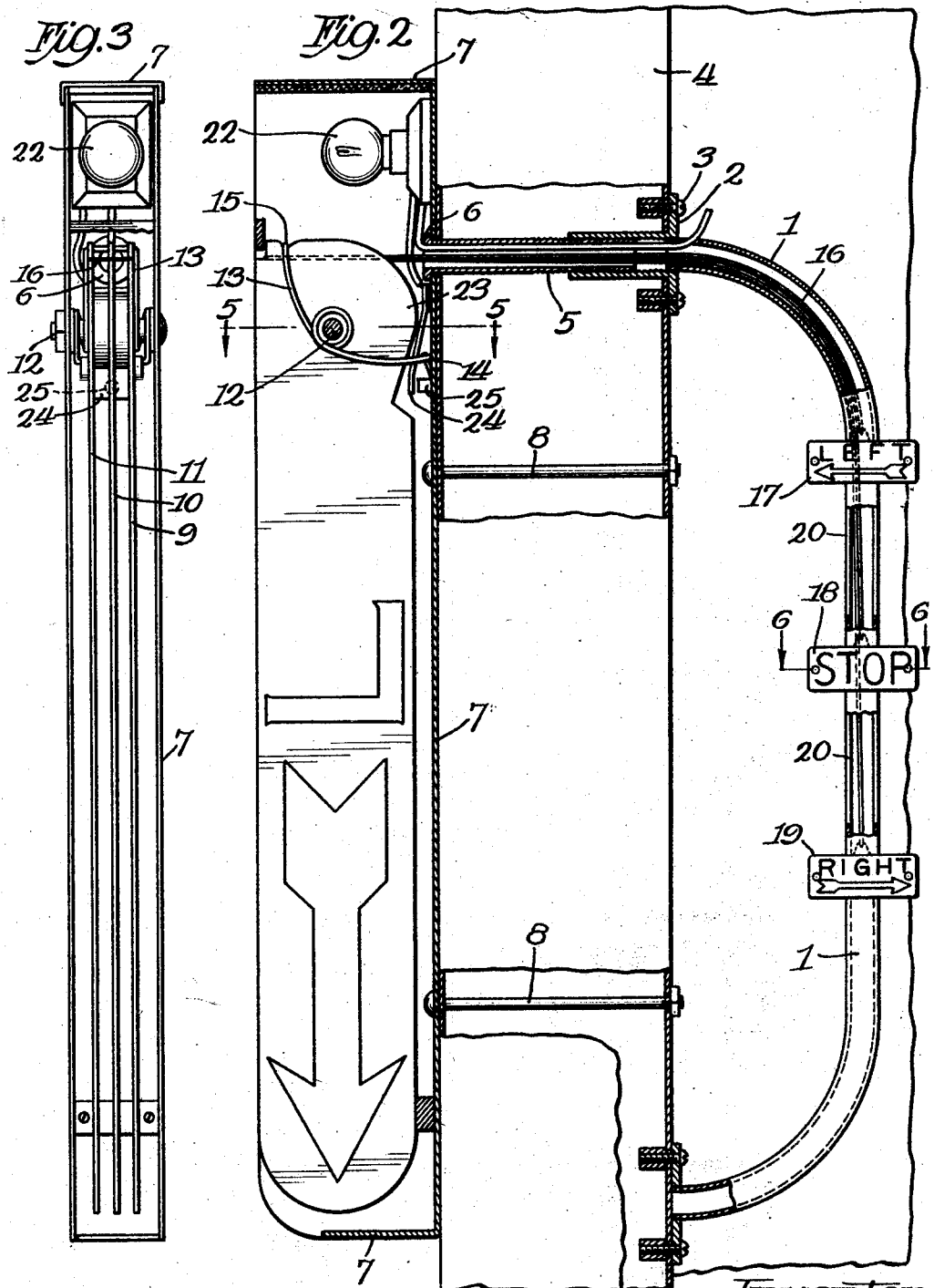

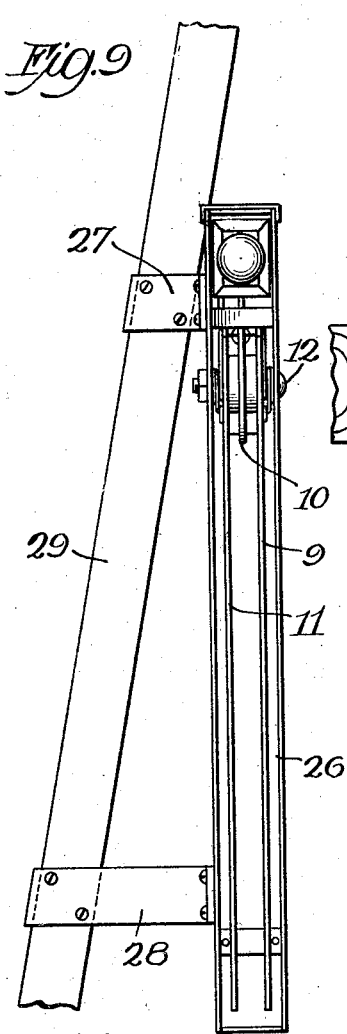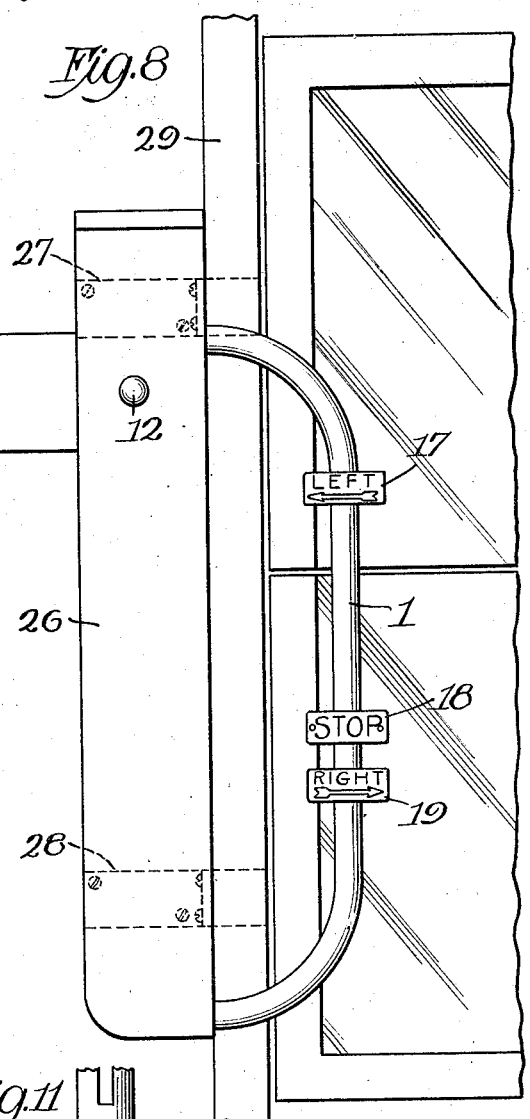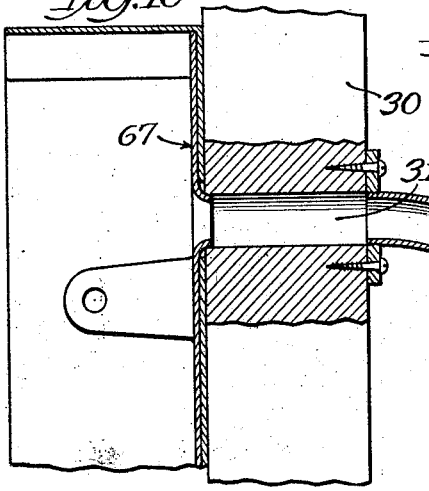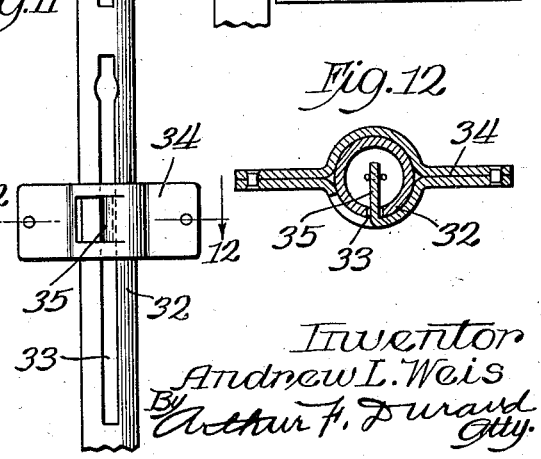

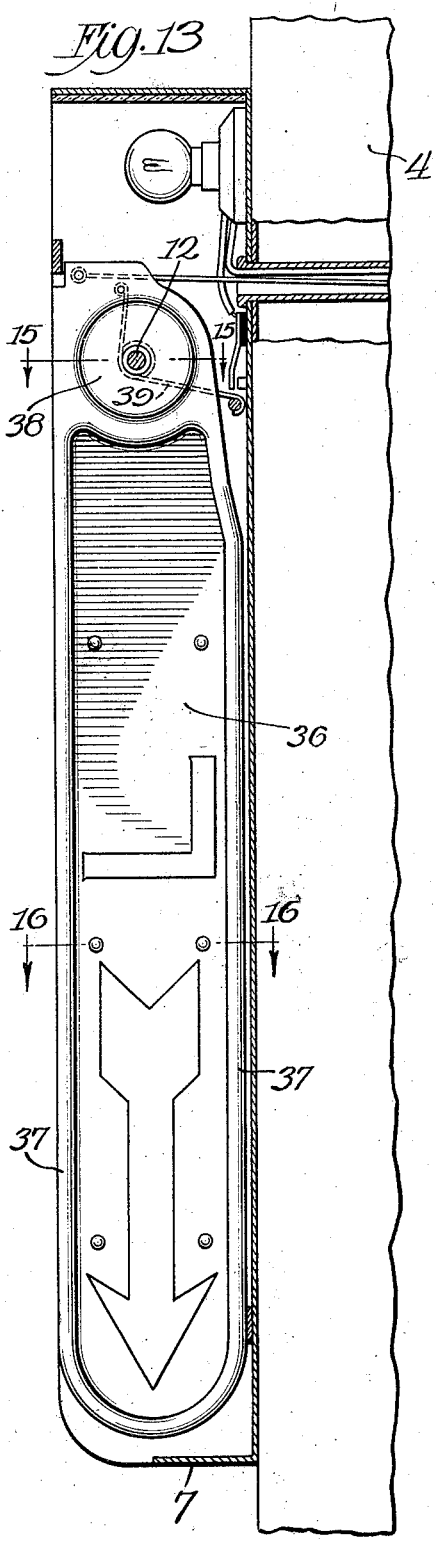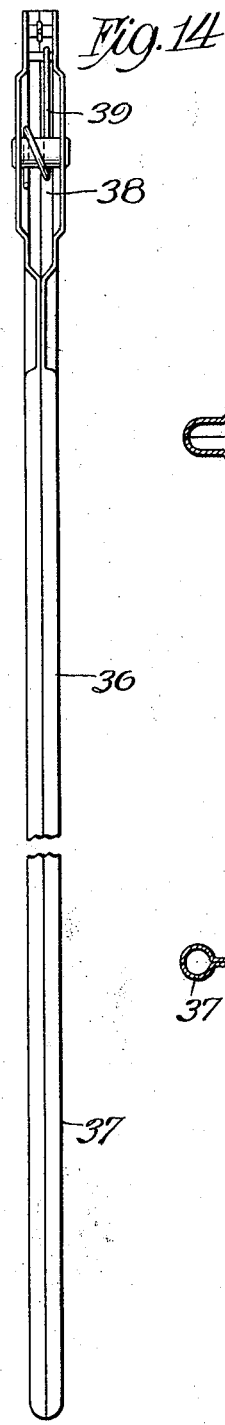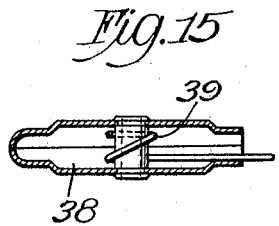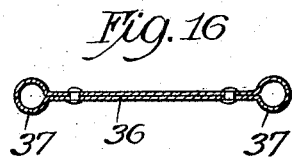

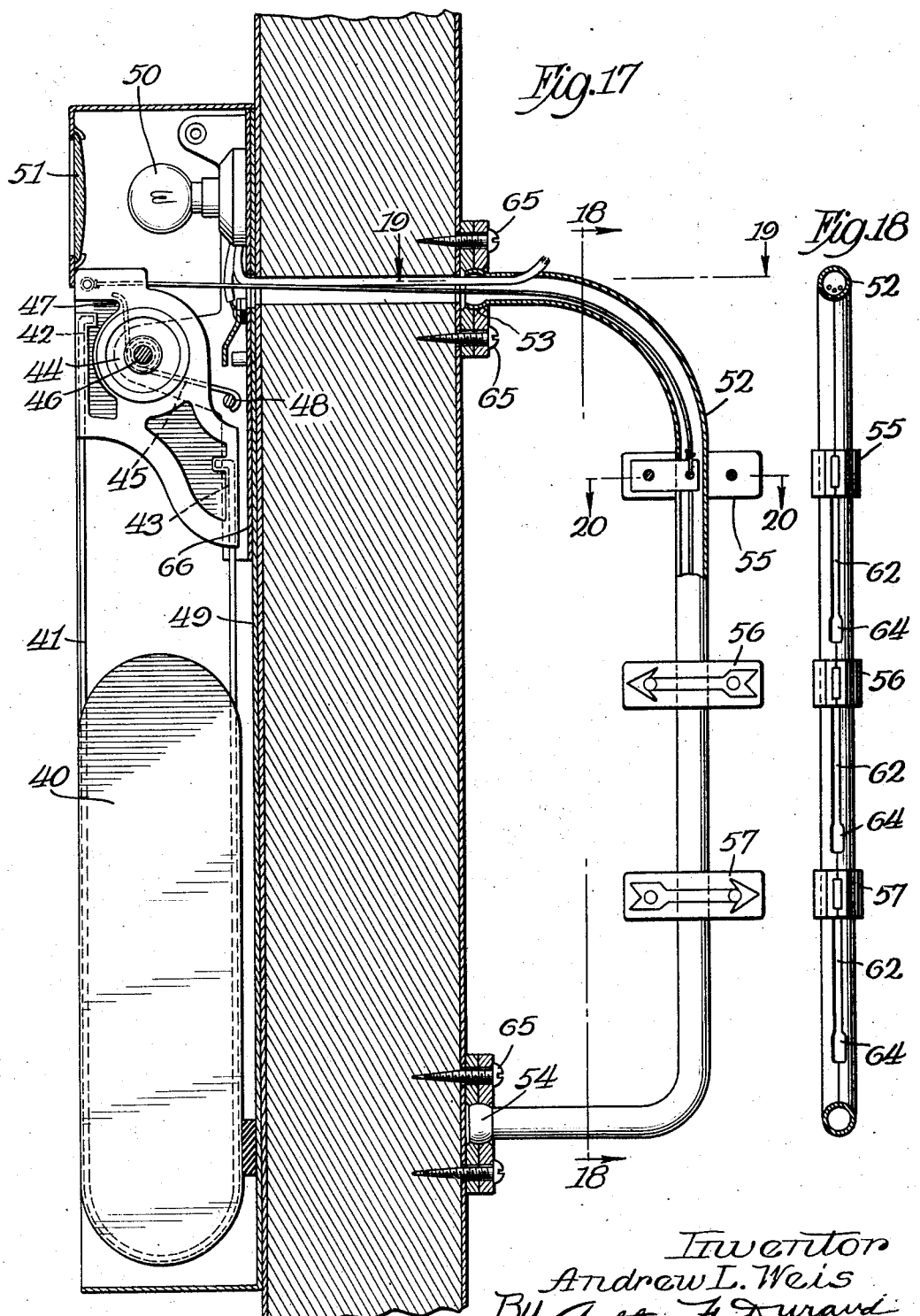

Aug. 5, 1930. A. L. WEIS 1,772,375
AUTOMOBILE SIGNALING APPARATUS
Filed May 20, 1929   6 Sheets-Sheet 6
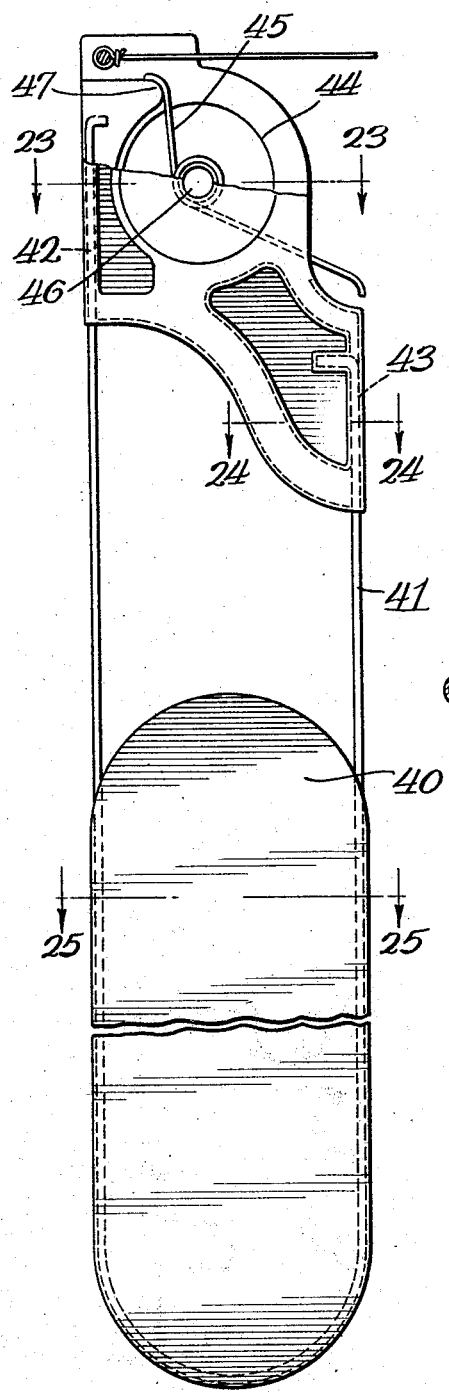
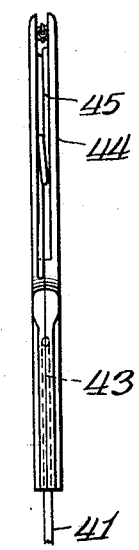
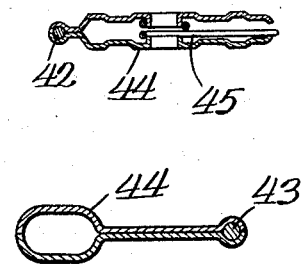
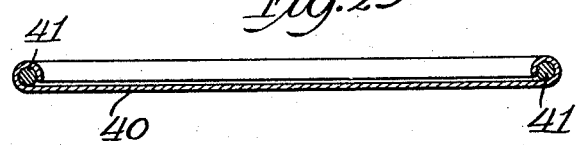
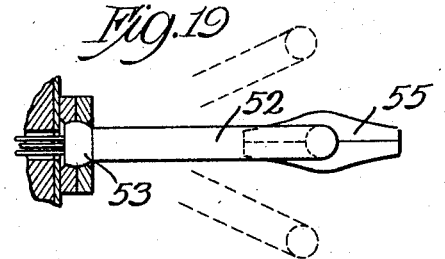
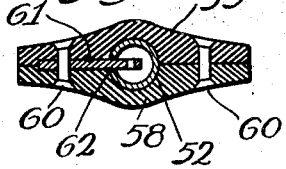
Inventor
Andrew L. Weis
By Arthur F. Durand
Atty.

Patented Aug. 5, 1930

1,772,375

UNITED STATES PATENT OFFICE

ANDREW L. WEIS, OF FORT LAUDERDALE, FLORIDA

AUTOMOBILE SIGNALING APPARATUS

Application filed May 20, 1929. Serial No. 364,352.

This invention relates to signaling means for motor vehicles, and more particularly to devices of this kind for indicating to the drivers of vehicles in the rear that the driver of the vehicle ahead is going to turn to the right or the left, or is preparing to stop.

Generally stated, the object of the invention is to provide a novel and improved construction whereby a motor vehicle signaling apparatus of this kind is easily attached to the front corner of the body of the car, preferably at the left-hand side thereof, or on the side adjacent the steering wheel, within convenient reach of the driver, whereby the latter may easily operate any one of a plurality of signals, thereby to indicate the intention of the driver to the drivers of vehicles in the rear, there being a separate controller for each signal, with each controller indicating over which signal it has control.

It is also an object to provide certain details and features of construction and combinations tending to increase the general efficiency and desirability of a motor vehicle signaling apparatus of this particular character.

To these and other useful ends, the invention consists in matters hereinafter set forth and claimed and shown in the accompanying drawings in which—

Fig. 1 is a front elevation of the windshield and adjacent structure of a motor vehicle, showing the same equipped with a signaling apparatus embodying the principles of the invention;

Fig. 2 is a rear elevation of said apparatus, on a larger scale, showing certain portions thereof in section;

Fig. 3 is a side elevation of the apparatus shown in Fig. 2;

Fig. 4 is a view similar to Fig. 2, with the lower portion thereof shown broken away for convenience of illustration;

Fig. 5 is an enlarged horizontal section on line 5—5 in Fig. 2;

Fig. 6 is an enlarged horizontal section on line 6—6 in Fig. 2;

Fig. 7 is a detail view, on a different scale, of a portion of the apparatus;
Fig. 8 is a view similar to Fig. 2, on a smaller scale, showing a different form of the invention;

Fig. 9 is a side elevation of the structure shown in Fig. 8;

Fig. 10 is a fragmentary detail view, on about the same scale as Fig. 2, showing a different form of the invention;

Fig. 11 is a fragmentary detail view showing a different form of the invention;

Fig. 12 is an enlarged horizontal section on line 12—12 in Fig. 11;

Fig. 13 is a view similar to Fig. 2, on substantially the same scale, with certain portions broken away for convenience of illustration, showing a different form of the invention;

Fig. 14 is a side elevation or edge view of one of the signals shown in Fig. 13;

Fig. 15 is a horizontal section on line 15—15 in Fig. 13, on a larger scale;

Fig. 16 is a horizontal section through one of the signals on line 16—16 in Fig. 13, on a larger scale.

Fig. 17 is a view similar to Fig. 2, showing a different form of the invention;

Fig. 18 is a vertical section on line 18—18 in Fig. 17;

Fig. 19 is a detail horizontal section on line 19—19 in Fig. 17;

Fig. 20 is an enlarged horizontal detail section on line 20—20 in Fig. 17;

Fig. 21 is an enlarged side elevation of the semaphore or movable signal member shown in Fig. 17;

Fig. 22 is a view of the right-hand upper edge portion of the structure shown in Fig. 21;

Fig. 23 is a detail horizontal section on line 23—23 in Fig. 21;

Fig. 24 is an enlarged detail section on line 24—24 in Fig. 21;

Fig. 25 is an enlarged detail section on line 25—25 in Fig. 21.

As thus illustrated, and referring to Figs. 1 to 7 inclusive, the invention comprises a metal tube 1 bent as shown in Fig. 2 of the drawings and screw-coupled at its upper end to the bracket 2, secured by screws 3 to the inner side of the sheet metal corner post 4 of the motor vehicle. A horizontal tube 5 continues this tubular connection to the outer side of said corner post, and terminates in an open end 6 within the sheet metal housing 7, secured by bolts 8 to said corner post, as shown. In this housing 7, there are three pivoted semaphores or signals 9, 10 and 11, which have a common pivot 12 near their upper ends, and which are controlled by the spring 13, which is common to said signals, and which has one end portion secured at 14 to the housing, while its transverse upper end portion 15 extends across the upper edges of the signals. In this way, the spring 13 tends normally to keep the signals in vertical position, as shown in Fig. 2 of the drawings. Cords 16, or other flexible connections, connect the three signals, from their upper ends, with the three handles or buttons 17, 18 and 19, as shown, these handles or buttons being slidable up and down on the tube 1 in slots 20 formed in the tube, each handle or button having a flat middle piece 21 slidable in one of said slots.

The signals 9, 10, and 11 are provided with suitable indications, one indicating that the driver intends to turn to the right, as shown in Fig. 4, and another indicating that the driver intends to turn to the left, as shown in Fig. 2, and another indicating that the driver intends to stop, as shown in Fig. 1. These markings or indications can be on both the front and rear sides of the said semaphores or signals. Therefore, the three signals are selectively operable by means of the handles or buttons 17, 18 and 19, in a manner that will be readily understood, these handles having markings corresponding to their allotted signals.

To illuminate the signals, as at night, an electric lamp 22 is provided in the upper portion of the housing 7, as shown, in position to illuminate the signals when they are raised into horizontal position. Normally, this lamp is not illuminated, but when a handle 17, 18 or 19 is pulled downward, one of the signals 9, 10 or 11 will be raised, and such action will cause the heel 23 of the raised signal to bear against a spring contact 24 and press this contact against the stationary electrical contact 25, thereby closing the circuit of the lamp. It will be understood that the current supply may be of any suitable character, for said circuit, and it will also be understood that said circuit may include a hand-switch (not shown) by which this illuminating apparatus can be rendered operative or inoperative.

Referring to Figs. 8 and 9, the construction is substantially the same as previously described, but in this case the housing 26 for the signals is supported upright on brackets 27 and 28, whereby the apparatus may be attached to an inclined wind-shield 29, instead of to a vertical corner post of a vertical wind-shield. Thus, notwithstanding the slant of the wind-shield 29, the housing 26 will be disposed in vertical position.

In Fig. 10, the construction is similar to that shown in Fig. 2, but in this case the corner post 30 is of solid wood, instead of being made of sheet metal, and hence in this construction the hole 31 through the said post does not need the tube 5 shown in Fig. 2 of the drawings.

In Figs. 11 and 12, another form of handle or button construction is shown. In this case, the tube 32, corresponding to the tube 1 in Fig. 2, has only the single slot 33, and the slidable handle or button 34 has the single projection 35 extending into the tube, to which the cord or flexible connection is attached, instead of having the cross-piece 21, to which the cords or flexible connections 16 in Fig. 2 are attached.

In Figs. 13, 14, 15 and 16, the construction is similar to that shown in Fig. 2, but in this case the semaphores or signals are of a different form. As shown, the signal 36, for example, is a sheet metal affair with longitudinal hollow edge ribs 37 that serve to stiffen the comparatively light semaphore or signal thus constructed. In this way, each semaphore or signal can be made very light and, in addition, the head or hinged portion of each signal can be hollow, having a chamber 38, as shown in Fig. 15, and each signal may have an individual spring 39 disposed in such chamber, as shown, thereby to return the signals to normal position, instead of having the single or common spring 13, as shown in Figs. 2 and 5 of the drawings. This makes a very light semaphore or signal which can be raised into horizontal position by a comparatively slight downward pull on its allotted handle or button.

Referring to Figs. 17 to 25, inclusive, the construction here is similar to that previously described, but in this case the semaphore or signal 40 is preferably made of some light material, such as celluloid, and is provided with a light wire frame 41 having its end portions 42 and 43 anchored in the sheet metal head 44, which latter is preferably hollow, as shown in Figs. 22, 23 and 24, to insure lightness thereof. The spring 45 is coiled about the pivot 46 of the semaphore, and has its upper end disposed in pressure engagement with the shoulder 47 on the head 44, and has its lower end disposed in pressure engagement with the pin 48 on the housing 49 of the semaphore. The electric lamp 50 is arranged as previously described, but in this case has a lens 51, or other light refracting or distributing element, disposed in position to direct the light rays onto both sides of the semaphore, when the latter is in raised position.

Furthermore, in Figs. 17 to 25, inclusive, the tube 52 is swivelly mounted at its upper and lower ends, as by ball and socket joints 53 and 54, provided as shown, whereby this tube 52 can be folded or swung into convenient position, as indicated in dotted lines in Fig. 19 of the drawings. Furthermore, the handles or buttons 55, 56 and 57 are each constructed as shown in Fig. 20, each button being composed of two halves 58 and 59, held together by rivets 60, these halves being preferably made of some durable non-metallic substance, and there being a metal insert 61 between them. This metal insert 61 extends through the slot 62 in the tube 52 and engages one of the cords 63, previously mentioned, whereby the three semaphores, each like the semaphore 40, are controlled by the three handles or buttons, in the manner previously described.

As shown in Fig. 18, each slot 62 may have a slight enlargement 64 at its lower end, to receive the metal portion 61, previously described, so that each handle may be frictionally held in its down position. This may be accomplished by using sheet metal for the tube 52, having some resilience, and by making the slot 62 a little tight, so that the edges of the slots will frictionally engage the portion 61, whereby it will require a little upward pressure on the handle to move it out of the enlargement 64 into the slot, whereby means are provided for yieldingly holding the semaphore in its raised position. By tightening the screws 65, the tube 52 can be held in any adjusted position, any position which is most convenient for the driver of the motor vehicle.

Preferably, the semaphores or signals and the lamp are all mounted on a separate plate or member, such as the member 66 in Fig. 17, or the member 67 in Fig. 10, whereby the movable part assembly thus provided can be easily inserted in the housing, afterward, instead of assembling the working parts directly in the housing in the first place. The mounting 66 or 67 can be secured to the inner back wall of the housing, in any suitable or desired manner, either permanently or detachably, as may be desired. In every case, the means for attaching the housing to the vehicle may be of any suitable known or desired character, depending more or less upon the type of vehicle upon which it is desired to use the invention.

In each form of the invention, therefore, there is a plurality of signals, one for each separate purpose, and there are as many handles or controllers for said signals, correspondingly marked, within reach of the driver, so that the driver may conveniently reach forward and pull downward on one of the handles or controllers and thereby indicate, by raising the corresponding signal, an intention to turn to the right or the left, or to stop. In this way, it is necessary to thrust a hand out of the window, to indicate to drivers in the rear the intention of the driver of the motor vehicle ahead. Furthermore, with signaling apparatus of the kind shown and described, which is illustrative of the invention, it is not necessary to keep a window down at the driver's elbow, in order to signal with the hand, as signals, which are mounted outside, are controllable from the inside when the window is in closed position, as well as when the window is open. The apparatus is easily installed on practically any make of motor vehicle, and is comparatively inexpensive in form. During the day, the electric lamp does not need to be illuminated, but at night the hand-switch (not shown) can be closed to render the illuminating apparatus operative, and under such circumstances the lamp will be illuminated each time a signal is pulled into raised position, in the manner previously explained.

While the signaling apparatus is shown attached to the corner post of the windshield, on whichever side the steering wheel is located, it is obvious that the apparatus may be supported either wholly or in part by any suitable member or portion at the side of the motor vehicle, or by one or more members or portions at the side of the vehicle, without departing from the spirit of the invention.

What I claim as my invention is:

1. Signaling apparatus for motor vehicles, comprising a housing for attachment to the vehicle, a hollow support and means whereby its upper end is in communication with the upper portion of said housing, means for mounting said hollow support in position on a stationary portion of the vehicle and within reach of the driver, with said means of communication covered by the vehicle, a plurality of pivoted signals in said housing, provided with a common pivot whereby each signal is supported to swing up and down about a horizontal axis extending parallel with the vehicle, and a plurality of individually operable handles on said support, corresponding to said signals, each handle being movable back and forth in a straight line, together with an individual operating pull connection between each handle and its allotted signal, enclosed in said support and in said means of communication, each pull connection having a portion extending coincident with said line of movement of its handle, whereby each handle is operative to raise its allotted signal into signaling position, and whereby each pull connection has only longitudinal movement at its allotted handle, when its handle is operated.

2. A structure as specified in claim 1, said support comprising a tube having a slot therein for each handle, each said operating connection being a flexible connection housed and guided in said tube.

3. A structure as specified in claim 1, said signals being concealed at front and rear when in normal position, but being visible to the drivers of other motor vehicles when raised into signaling position.

4. A structure as specified in claim 1, said signals having spring means for yieldingly holding them in concealed position in said housing, whereby each signal automatically pulls and restores its allotted handle to normal position, when the raised signal swings downward to normal position.

5. A structure as specified in claim 1, each signal being of light sheet metal construction with stiffening ribs along the edges thereof, rendering each signal comparatively easy to raise into signaling position by a straight pull on its allotted handle.

6. A structure as specified in claim 1, said support having a conduit connection or communication at its end with the interior of said housing, and said operating connections extending through said conduit.

7. A structure as specified in claim 1, said support having a conduit connection or communication at its end with the interior of said housing, and said operating connections extending through said conduit, said conduit extending through the corner post of the wind-shield.

8. A structure as specified in claim 1, said signals being marked, respectively, "Right" and "Left", and their allotted handles being respectively marked the same way.

9. A structure as specified in claim 1, said signals being marked, respectively, "Right", "Left" and "Stop", and said handles being marked respectively in the same way.

10. A structure as specified in claim 1, said support being mounted for adjustment to swing laterally into convenient position.

11. A structure as specified in claim 1, said support being mounted for adjustment to swing laterally into convenient position, said support being a tube swivelled at its upper and lower ends to swing about a vertical axis, said tube containing said operating connection for each handle on its allotted signal.

12. In signaling apparatus for automobiles, the combination of a tube with a vertically disposed portion, said vertically disposed portion being slotted longitudinally thereof, pull wires in said tube, signaling means controlled by said wires, and handles slidable on the slotted portion of said tube, one above another, and connected through the slot to said wires.

13. A structure as specified in claim 12, said tube having an overhead horizontally disposed portion terminating at said signaling means, and means for supporting the tube in position.

14. A structure as specified in claim 12, the slotted portion of said tube having a separate slot for each handle, the slots being in alinement.

15. A structure as specified in claim 12, said handles being each composed of two sections bent around the tube to slide thereon, with an integral portion of one section extending through the slot in the tube, and means for fastening the two sections together.

16. A structure as specified in claim 12, comprising means for supporting the vertically disposed portion of said tube on the corner post in front of the driver.

17. In signaling apparatus for automobiles, the combination of a hollow support, means for mounting said support inside the vehicle in front of the driver, said mounting means having means whereby said support is laterally adjustable to suit the convenience of the driver, handles supported by said support and movable up and down, signaling devices normally concealed but visible, when operated, from behind the vehicle, and pull wires connecting said handles with said signaling devices.

Specification signed this 16th day of May, 1929.

ANDREW L. WEIS.